United States Patent [19]

Evans

[11] 4,391,355
[45] Jul. 5, 1983

[54] SLIDING CALIPER DISC BRAKE

[75] Inventor: Anthony C. Evans, Northville, Mich.

[73] Assignee: Kelsey-Hayes Company, Romulus, Mich.

[21] Appl. No.: 99,392

[22] Filed: Dec. 3, 1979

[51] Int. Cl.³ ............................................. F16D 65/00
[52] U.S. Cl. ................................. 188/73.44; 188/73.1
[58] Field of Search ..................... 188/72.1, 72.4, 73.1, 188/73.3, 73.6, 73.44, 73.45

[56] References Cited

U.S. PATENT DOCUMENTS

| 3,442,356 | 5/1969 | Hahm | 188/72.4 |
| 3,848,709 | 11/1974 | Tourneur | 188/73.3 |
| 4,046,232 | 9/1977 | Kellogg | 188/73.3 |
| 4,151,899 | 5/1979 | Wright | 188/73.3 |
| 4,200,173 | 4/1980 | Evans et al. | 188/73.3 |
| 4,220,223 | 9/1980 | Rinker et al. | 188/73.1 |
| 4,225,017 | 9/1980 | Op den Camp | 188/73.3 |

FOREIGN PATENT DOCUMENTS

| 2235693 | 2/1973 | Fed. Rep. of Germany | 188/72.4 |
| 2334553 | 1/1974 | Fed. Rep. of Germany | 188/73.3 |
| 2828934 | 6/1977 | Fed. Rep. of Germany | 188/73.3 |
| 2226039 | 11/1974 | France | 188/73.45 |
| 2034425 | 6/1980 | United Kingdom | 188/73.45 |

Primary Examiner—Joseph E. Valenza
Attorney, Agent, or Firm—Ralph J. Skinkiss

[57] ABSTRACT

A pin type floating caliper low drag disc brake for a vehicle is disclosed in which the braking torque is transferred directly to a vehicle frame member for a non-steerable wheel and directly to a wheel spindle for a steerable wheel. An outboard brake pad assembly is mounted on the caliper which floats on a first pin located adjacent the leading edge of the caliper and an inboard brake pad assembly floats on a second pin located adjacent the trailing edge of the caliper. The braking torque is transferred through the pins to the vehicle.

6 Claims, 19 Drawing Figures

SLIDING CALIPER DISC BRAKE

BACKGROUND OF THE INVENTION

This invention relates to a disc brake for vehicles such as automobiles and, more particularly, to an improved pin type floating caliper disc brake wherein the braking torque is transmitted directly to the vehicle through the pins.

One type of disc brake assembly known in the prior art includes a sliding caliper which is mounted to straddle a disc. An outboard brake pad, mounted on the caliper outboard leg, engages the outer friction surface of the rotating disc. The caliper inboard leg includes a hydraulic piston which, when actuated, presses an inboard brake pad against the inner friction surface of the disc. At the same time, the caliper slides so that an equal and opposite force is applied by the outboard pad to the disc, thereby causing a braking action. When the hydraulic pressure is removed from the piston, the brake pads will drag along the disc. Ideally, the brake pads will float slightly away from the disc surface so that limited friction occurs. Any drag between the disc and the brake pads reduces the efficiency of the vehicle and causes premature wearing of the pads. The support pins in prior art brakes are normally mounted either on the caliper assembly or, in the case of a floating caliper disc brake, the pins are mounted on an anchor plate. The anchor plate being rigidly attached to the vehicle structure. In the case of steerable wheels, the anchor plate is attached to the wheel spindle and in the case of non-steerable wheels, the anchor plate is attached to the vehicle frame or some other frame member which is suspended with the wheels. In either case, the anchor plate is undesirable since it adds considerable weight both to vehicle and to the wheel suspension. This in turn requires the use of heavier suspension components for the wheels.

SUMMARY OF THE INVENTION

According to the present invention, an improved low drag pin type floating caliper disc brake is provided for a vehicle such as an automobile. The disc brake is mounted to float on two pins which are attached directly to the wheel spindle for a steerable wheel or to the vehicle frame member in the case of a non-steerable wheel. The caliper assembly, which mounts the outer brake pad assembly, floats on one of the pins which is located adjacent the leading edge of the caliper. The inner brake pad assembly floats on the second pin which is located adjacent the trailing edge of the caliper. As a consequence, the braking torque is distributed between the two pins. Alternatively the caliper assembly may be mounted on the trailing pin and the inner brake pad assembly can be mounted on the leading pin if the bias on the outer pad assembly is reversed. Since the two brake pad assemblies float on pins located at opposite ends of the pad assembly, the pad assembly tends to move or pivot in a scissor-like action and produce less frictional drag on the disc when the brake is released. Since the pins are connected directly to the vehicle without the use of an anchor plate, the weight of the anchor plate is eliminated which in turn increases the efficiency of the vehicle wheel suspension system and of the vehicle itself since the weight of the vehicle is reduced.

DETAILED DESCRIPTION OF THE INVENTION

Referring to the drawings, particularly to FIGS. 1-6, a disc brake 10 in accordance with the present invention is illustrated. The disc brake 10 is of the pin type in that it is supported on two pins 11 and 12. The pins 11 and 12 generally extend parallel with an axis 13 about which a disc or rotor 14 rotates. As used herein, the term "disc" is intended to be generic for a solid disc, a vented rotor and similar structures used in disc brakes. The pins 11 and 12 have generally the same radical spacing from the axis 13. With respect to a normal direction of rotation 15 for the disc 14, the pin 11 trails the pin 12.

The brake 10 includes a caliper 16 which is generally C-shaped and extends over the periphery of the disc 14. An outboard brake pad assembly 17 is mounted on the outboard leg 18 of the caliper 16. The caliper bridge extending between the outboard leg 19 and the inboard leg 18 is shaped to define a pair of parallel guides 20. The caliper inboard leg 19 defines a cylinder 21 in which a piston 22 moves. The piston 22 acts upon the inboard brake pad assembly 23 which moves relative to the caliper 16 along the guides 20. Antirattle spring clips (not shown) may be provided for the inboard pad 23, as is well known in the prior art.

As best seen in FIGS. 2, 3, 6, 7, and 12, the caliper 16, on which theoutboard brake pad assembly 17 is mounted, is slidably supported on the leadingpin 12. The leading pin 12 is attached directly by a threaded end 27 to the vehicle wheel suspension, such as to a wheel spindle 28 when the disc brake 10 is used with a steerable wheel. In the case of a non-steerable rear wheel, the pin 12 will be attached to a vehicle frame member which moves with the wheel suspension, for example, to the rear axial housing. As used herein in the following discussion and in the claims, "vehicle frame member" is intended to broadly cover any non-rotatable vehicle structure which maintains its relative position with respect to a vehicle wheel axle, such as a wheel spindle or an axle housing, or an anchor plate if a particular application of the brake so requires. As a consequence of mounting the pin 12 directly on the wheel spindle 28 or other suitable vehicle frame member, the pin 12 is generally disposed parallel to and at a constant spacing from the wheel and disc axis 13.

The caliper 16 is mounted on the pin 12 with a bushing assembly 29. The bushing 29 extends through a bore 30 in the inboard caliper leg 19 and includes a tubular sleeve 31 of a low friction material such as Teflon, between the bore 30 and the pin 12 (see FIG. 7). An annular seal 32 engages a corresponding annular groove located at the outboard end of the bore 30 and an annular seal 33 engages a corresponding annular groove in the inboard end of the bore 30. The seal 33 has a tubular end region 34 which extends from the bore 30 over the extending end 26 of the pin 12. The seals 32 and 33 prevent contamination of the bearing sleeve 32 from dirt, water and the like. The bushing 29 gives the caliper 16 the resiliency and transverse movement required for operation of the caliper 16 on support pin 12.

The inboard brake pad assembly 23 is provided with a steel back plate 35 having a trailing edge which is attached through the pin 11 to the wheel spindle 28, as best seen in FIGS. 3, 4, 8 and 12. The trailing pin 11 comprises a bolt 37 and a steel sleeve 38. The bolt 37 passes through the sleeve 38 and engages the wheel spindle 28, or other vehicle frame member. The sleeve 38 is parallel with and maintained at a constant spacing with respect to the pin 12, the axis 13 for disc 14 and the vehicle wheel (not shown). The trailing edge 36 of the back plate 35 is provided with an opening 39 which slidably engages the sleeve 38. The opening 39 may be formed directly in the backing plate 35 or may be defined by a bushing (not shown) attached to backing plate 35. As will be discussed in greater detail below, a slight clearance is preferably provided between the opening 39 and the sleeve 38 so that the inboard pad 33 may rock slightly about the axis of the pin 11 in addition to moving longitudinally on the pin axis. The inboard brake pad assembly 23 is provided with two arms 40 which extend radially past the disc 14. The arms 40 define grooves 41 which are spaced for sliding on the spaced guides 20 on the caliper bridge. The grooves 41 cooperate with the guides 20 for retaining the inboard brake pad assembly 23 on the caliper bridge. Sufficient clearance is provided between the guides 20 and the arms 40 to permit the inboard brake pad assembly 23 to tilt or rock slightly about the axis of its mounting pin 11.

Additional details of the inboard brake pad assembly 23 are shown in FIGS. 13–16. A composition friction pad 42 is mounted on the backing plate 35. The pad 42 is illustrated as being mounted on the backing plate 35 with five rivets 43 which are recessed or countersunk within the friction pad 42. The friction pad 42 may be formed from any conventional material used for brake pads. Although the friction pad 42 is illustrated as being riveted to the back plate 35, it should be appreciated that any suitable attaching technique known in the industry may be used. For example, the friction pad 42 may be integrally molded to the backing plate 35 using known methods. When the friction pad 42 is integrally molded on the back plate 35, the molded friction pad may extend into recesses, such as those provided for the rivets 43, to resist shear forces between the pad 42 and the back plate 35 during brake application.

Figures 13, 14, 15, 16, 17, 18, 19:
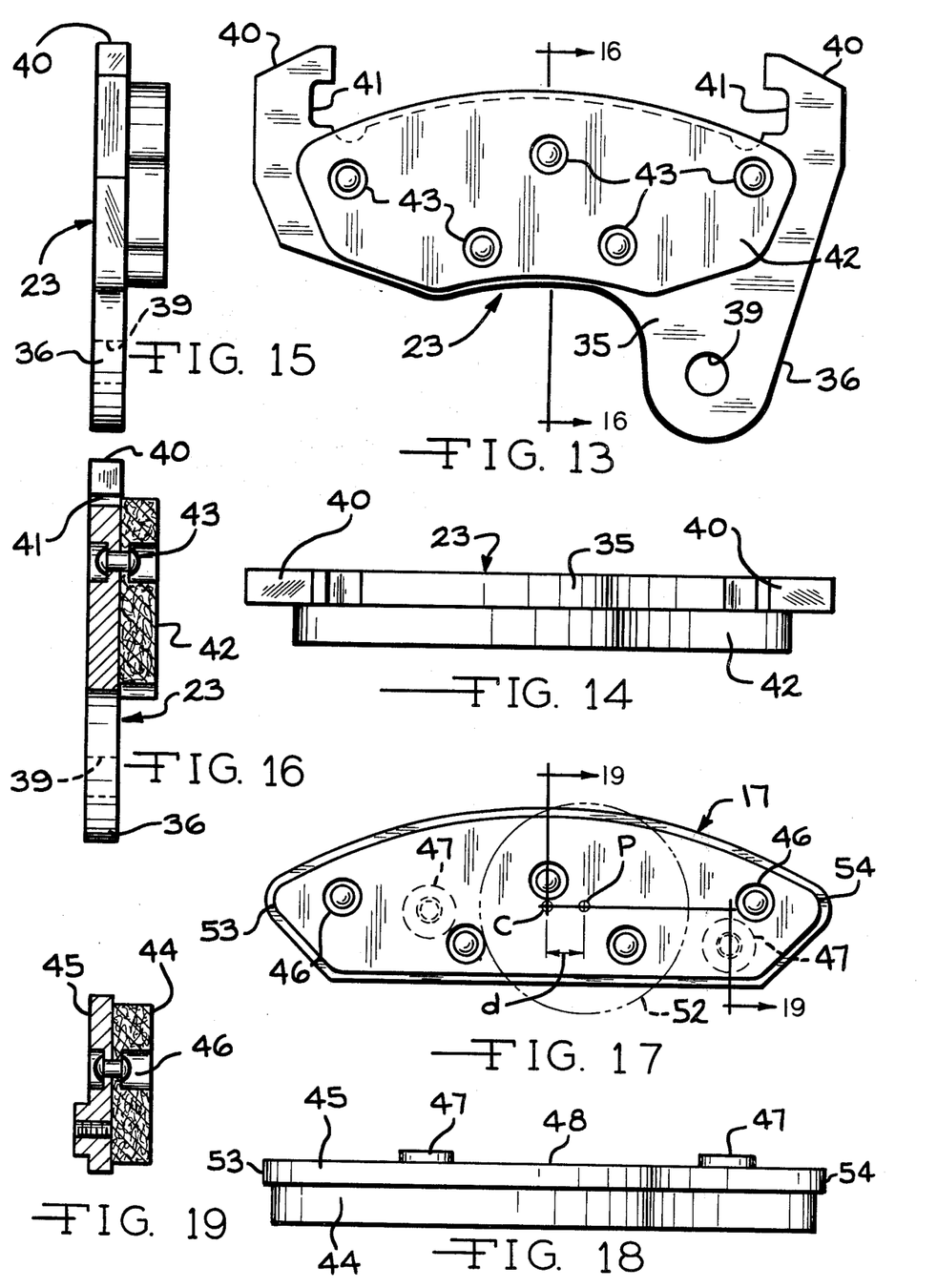
FIG. 13 is a side elevational view of an inboard brake pad for the disc brake of the present invention.
FIG. 14 is a top plan view of the disc brake pad of FIG. 13.
FIG. 15 is an end view of the disc brake pad of FIG. 13.
FIG. 16 is a cross sectional view taken along line 16—16 of FIG. 13.
FIG. 17 is a side elevational view of the outboard brake pad for the disc brake of the present invention.
FIG. 18 is a top plan view of the brake pad of FIG. 17.
FIG. 19 is a cross sectional view taken along line 19—19 of FIG. 17.

Additional details of the outboard brake pad assembly 17 are shown in FIGS. 17–19. The brake pad assembly 17 includes a friction pad 44 mounted on a backing plate 45 with rivets 46 or by any other suitable means. Two shoulders 47 are provided on a back or outboard side 48 of the back plate 45 for aligning the outboard pad assembly 17 to the two outboard legs 18 on the caliper 16. The shoulders 47 align with openings 49 in the caliper leg 18 for correctly orienting the brake pad assembly 17 with respect to the caliper 16, and provide for positive engagement with caliper leg 18 for transmitting braking torque from backing plate 45 to caliper leg 18. Threaded openings 50 are provided in the shoulders 47. Bolts 51 pass through the outboard caliper leg 18 and threadably engage the openings 50 for attaching the brake pad 17 to the caliper 16. Alternatively brake pad assembly 17 may be attached to the caliper leg 18 by other known methods, such as the spring clips.

Figure 1:
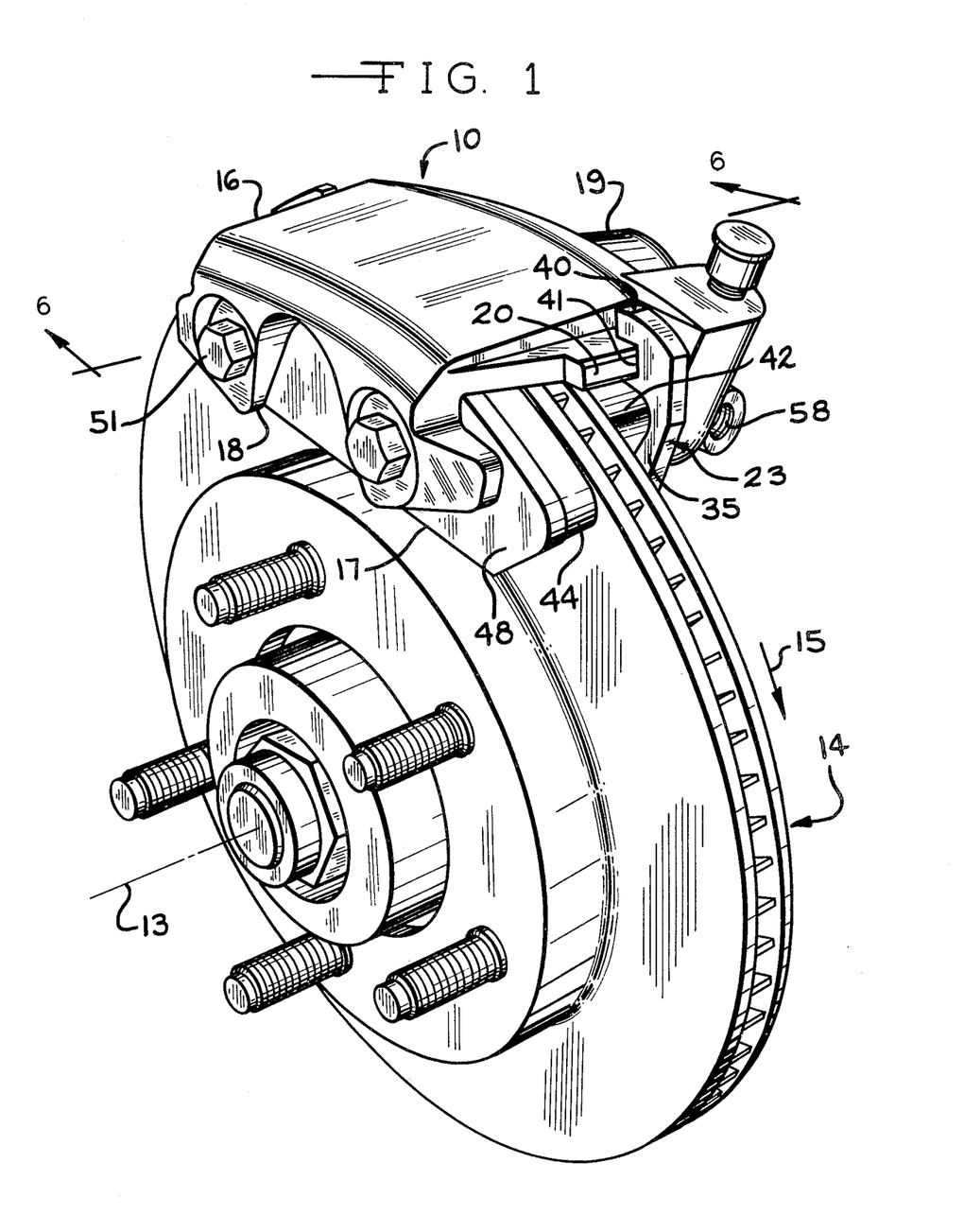
FIG. 1 is a perspective view of the disc brake constructed in accordance with the present invention, as viewed from the outboard side.
Figure 2:
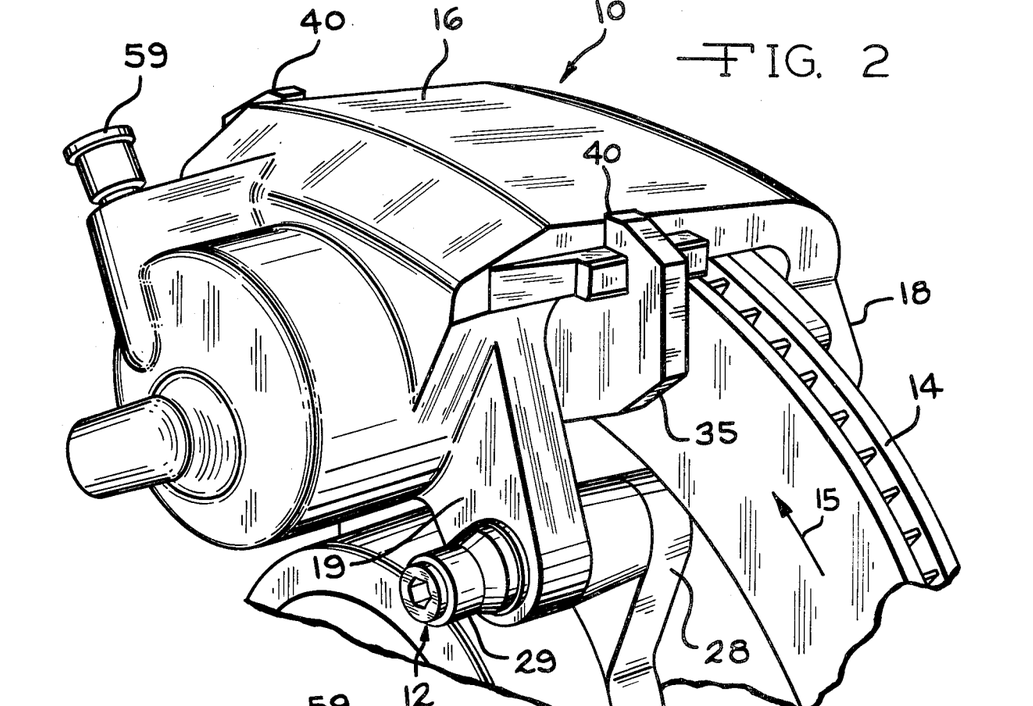
FIG. 2 is a perspective view of the disc brake shown in FIG. 1, as viewed from the inboard side.
Figure 3:
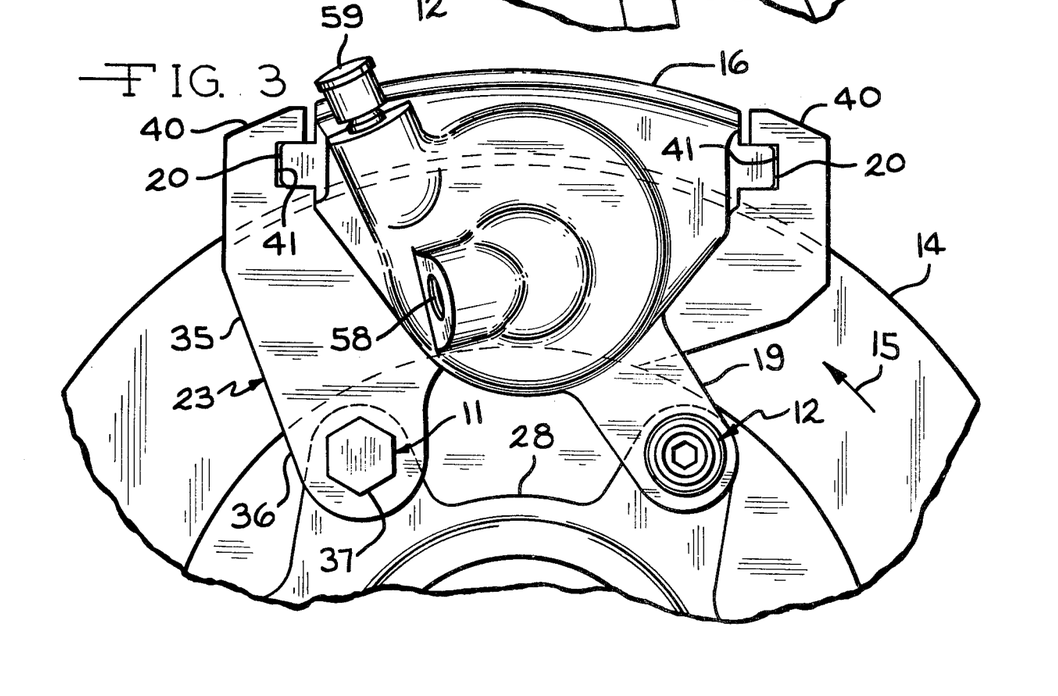
FIG. 3 is a rear elevational view of the brake shown in FIG. 1, as viewed from the inboard side.
Figure 4:
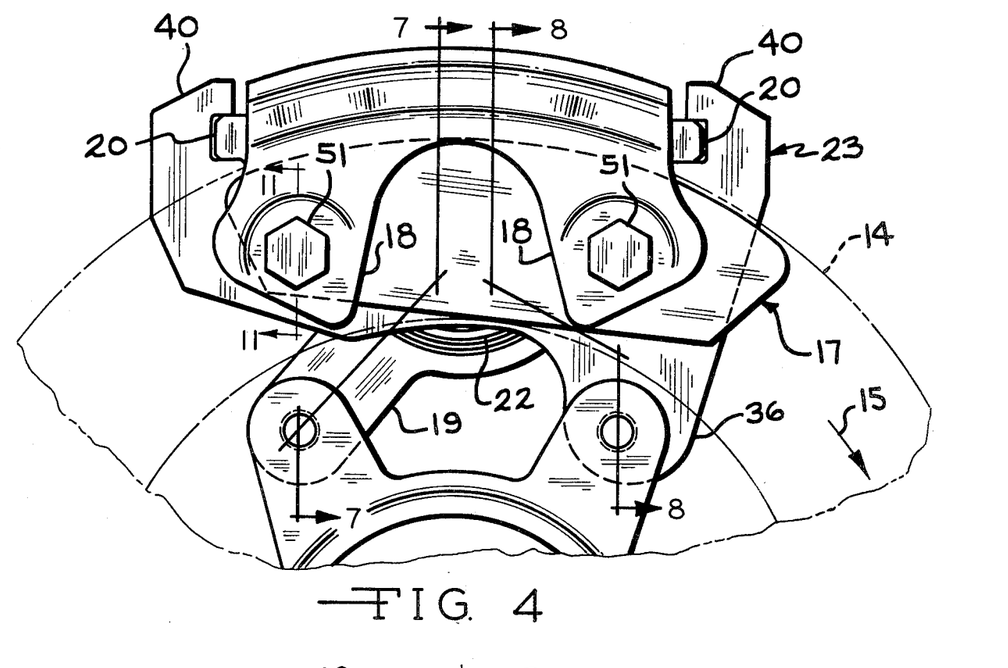
FIG. 4 is a front elevational view of the disc brake shown in FIG. 1, as viewed from the outboard side.
Figure 5:
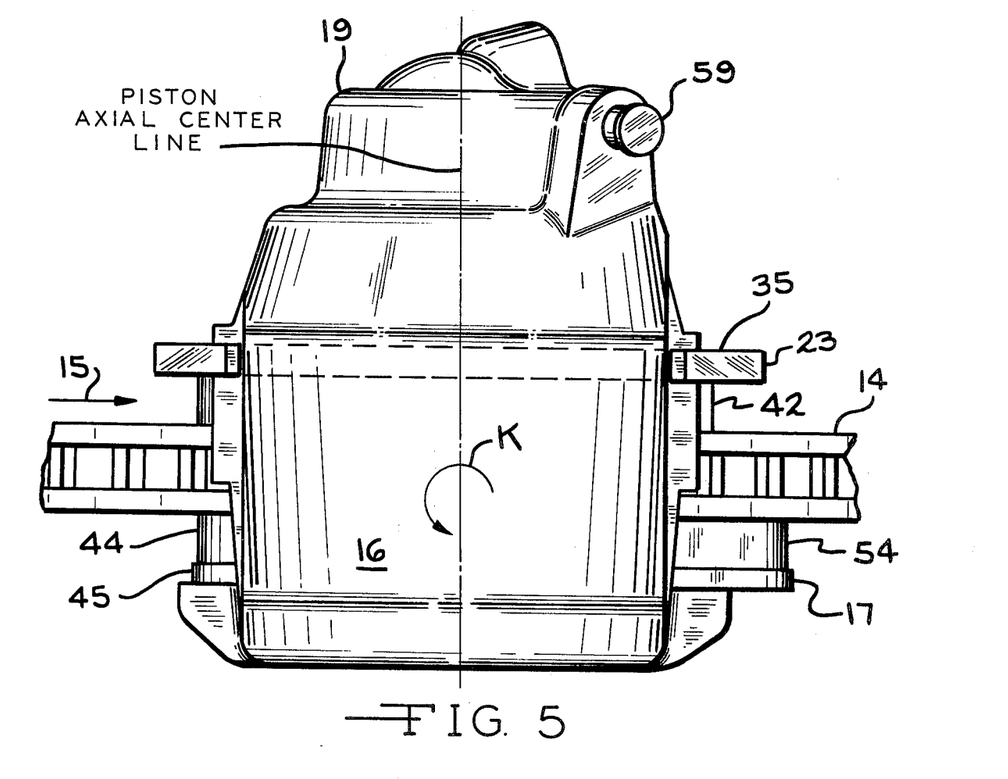
FIG. 5 is a top plan view of the disc brake shown in FIG. 1.
Figure 6:
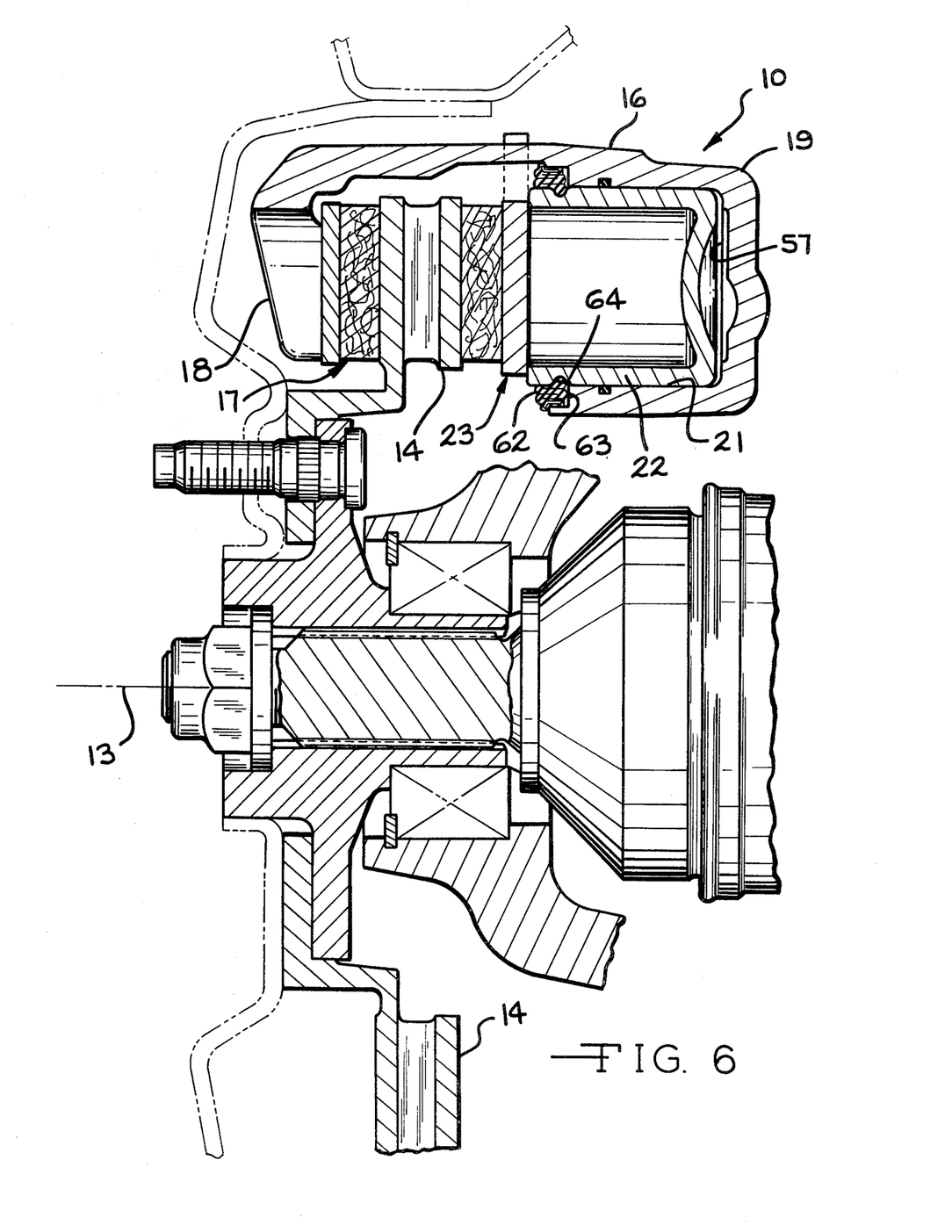
FIG. 6 is a longitudinal cross sectional view taken along line 6—6 of FIG. 1.
Figure 7:
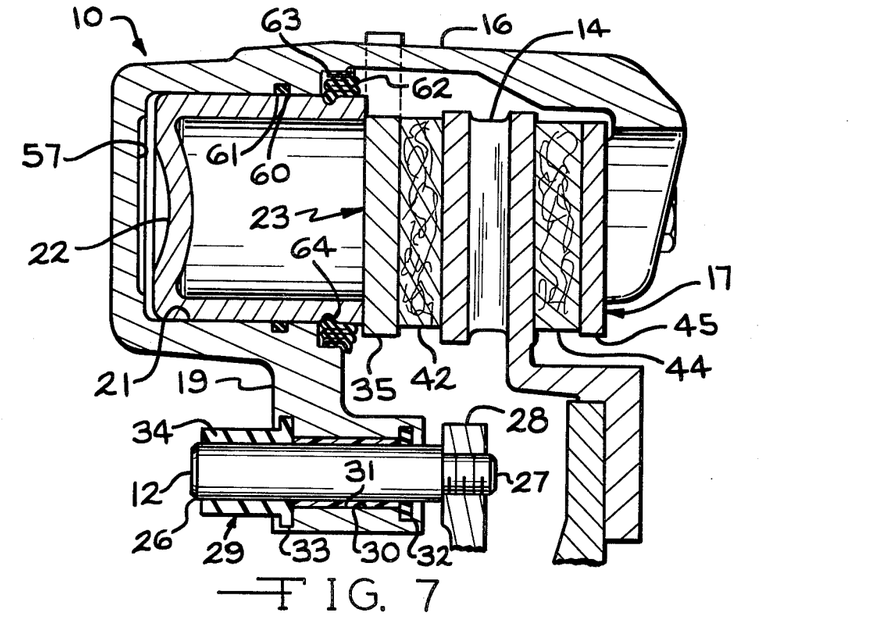
FIG. 7 is a cross sectional view taken along line 7—7 of FIG. 4.
Figure 8:
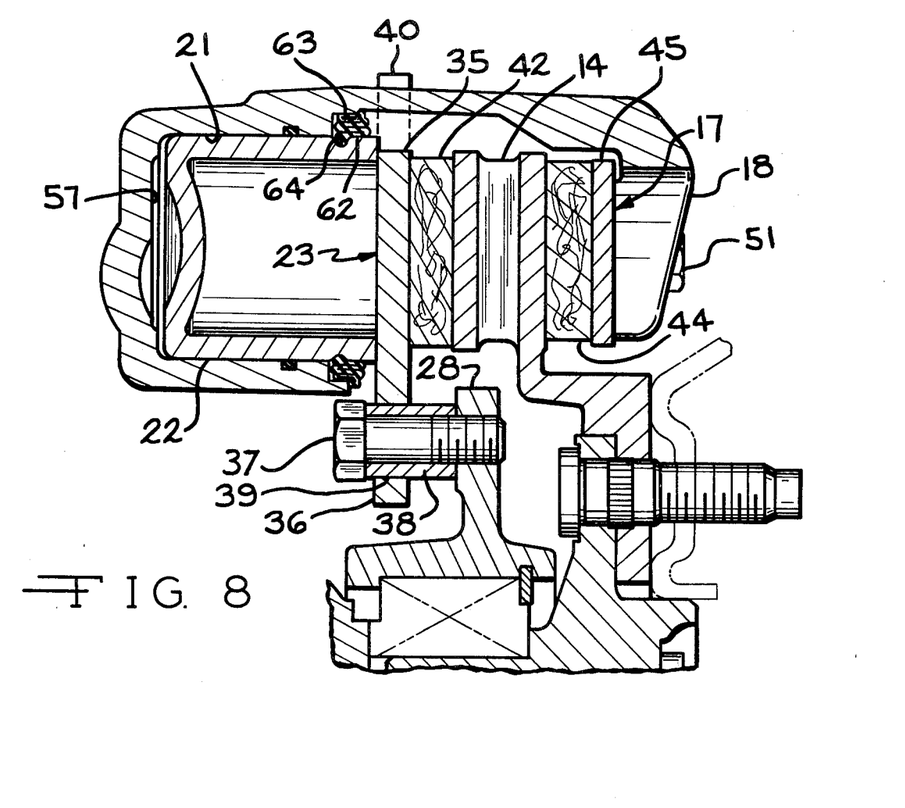
FIG. 8 is a cross sectional view taken along line 8—8 of FIG. 4.
Figure 12:
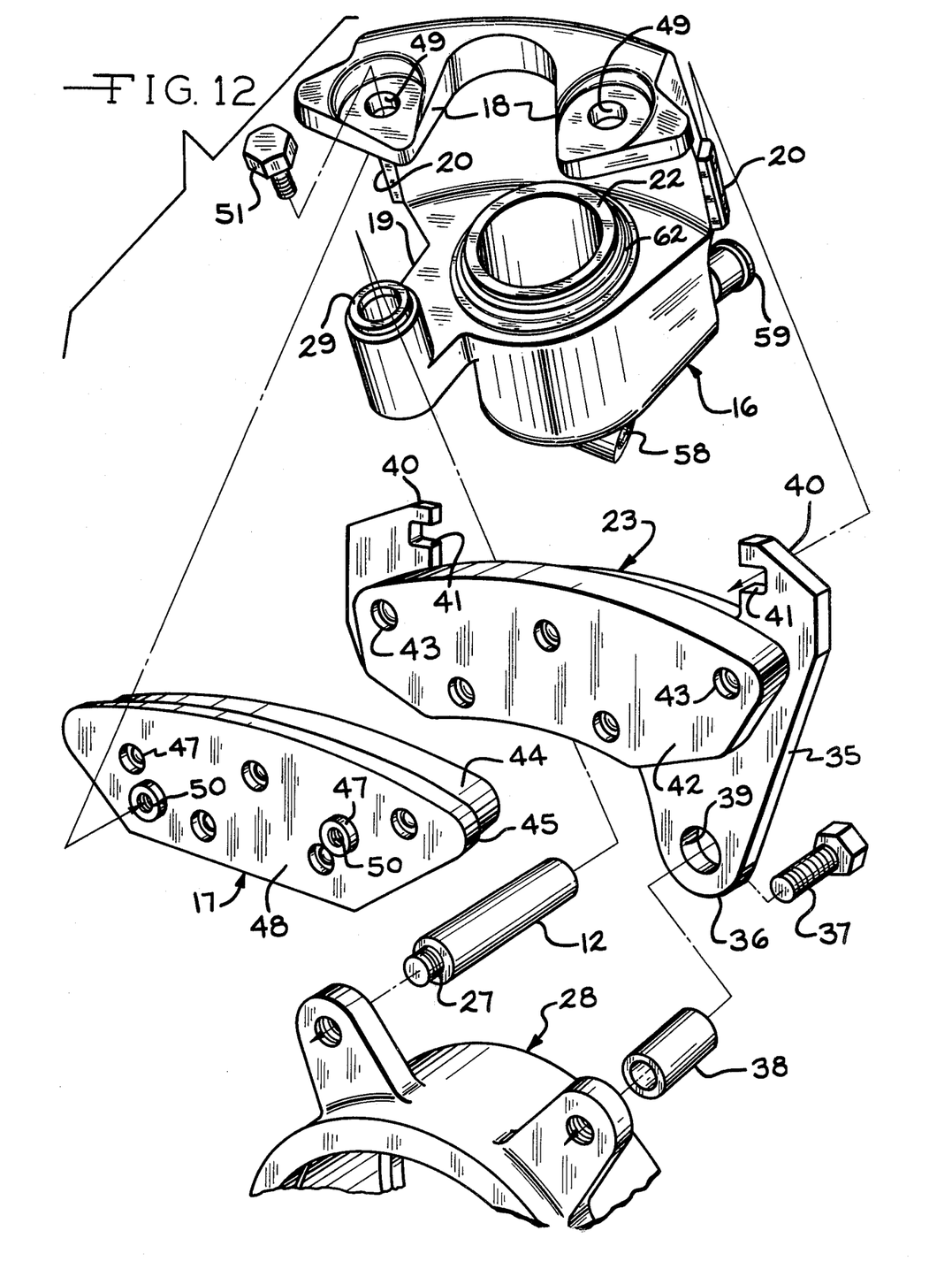
FIG. 12 is an exploded perspective view, partially broken away and partially in diagrammatic form, of the disc brake shown in FIG. 1.

FIGS. 7, 8 and 12 best illustrate the hydraulics for the disc brake 10. As previously indicated, a piston 22 is mounted to slide within a cylinder 21 formed in the outboard leg 18 of the caliper 16. Hydraulic fluid is introduced into a chamber 57 defined between the piston 22 and the cylinder 21 to move the piston 22 when the brake 10 is actuated. The hydraulic fluid may be introduced from a standard master cylinder (not shown) in the vehicle brake system which is connected through a brake line attached by means of a threaded fitting (not shown) to a thread opening 58 in the inboard caliper leg 19. A suitable valve 59 is provided for bleeding air from the chamber 57 when the brake 10 is initially connected to the vehicle brake system. An O-ring type seal 60 is mounted in an annular groove 61 formed in the cylinder 21 for providing a fluid seal between the cylinder 21 and the piston 22. In addition, a dust boot 62 is positioned to extend between an annular groove 63 at the outboard end of the cylinder 21 and an annular groove 64 in the piston 22. Dust boot 62 generally comprises a convoluted bellows shape and is illustrated in a collasped position in FIGS. 7 and 8 wherein the piston 22 is fully retracted into the cylinder 21. Dust boot 62 extends between the grooves 63 and 64 as the brake pads 17 and 23 wear or when the disc brake 10 is used with a thinner disc than disc 14 illustrated in the drawings, for example, a solid disc rather than a hollow ventilated disc.

Figure 9:
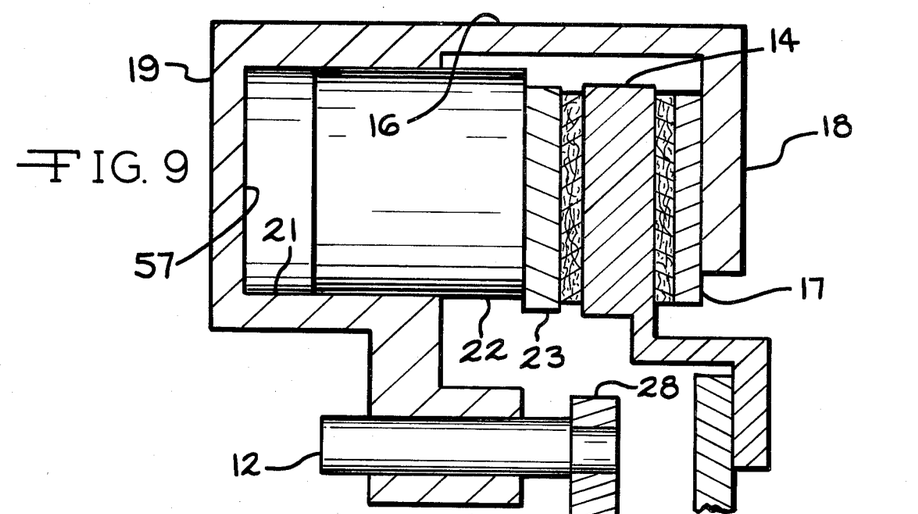
FIG. 9 is a diagrammatic cross sectional view similar to FIG. 7 and showing the operation of the brake as the pads wear.
Figures 10, 11:
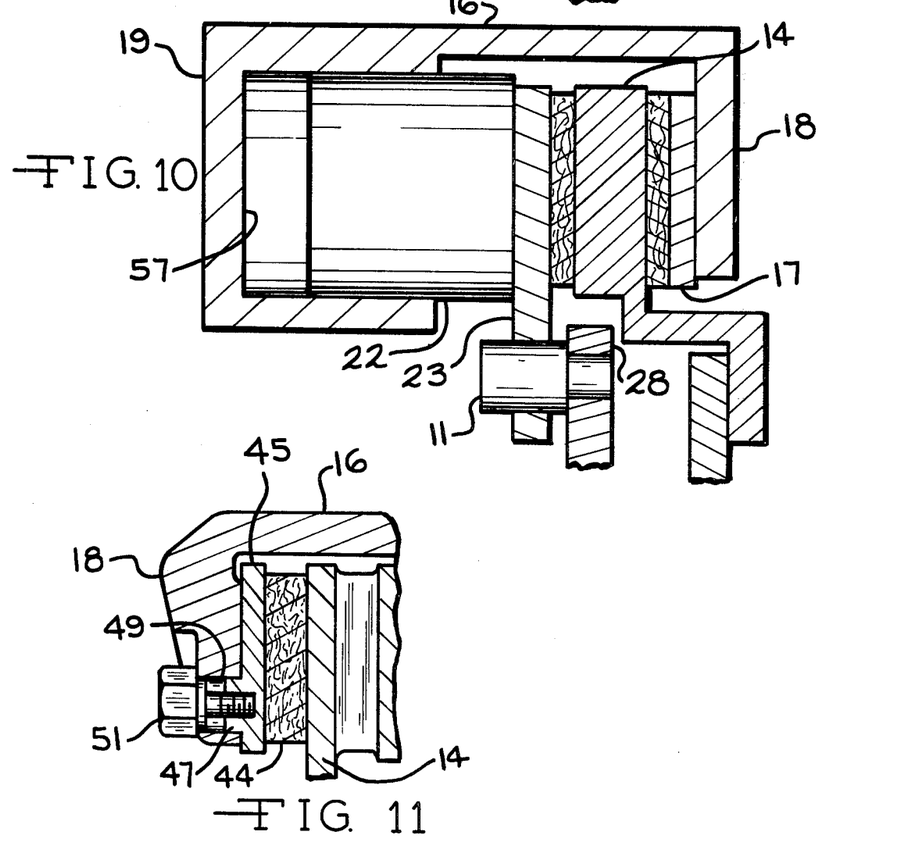
FIG. 10 is a diagrammatic cross sectional view similar to FIG. 8 and showing operation of the disc brake as the brake pads wear.
FIG. 11 is a cross sectional view illustrating the mounting of the outboard brake pad on the caliper and taken along line 11—11 of FIG. 4.

FIGS. 9 and 10 are diagrammatic illustrations corresponding to FIG. 7 and 8, respectively, and showing the relative positions of the caliper 16 and the piston 22 as the brake pads 44 and 42 wear. As the outboard pad 44 wears, the caliper 16 moves to the left on the pin 12, away from the wheel spindle 28. At the same time, the inboard pad 42 should wear in a similar amount. The piston 22 will extend in the cylinder 21 to maintain contact between the inboard pad 42 and the disc 14. As the pad 42 wears, it moves to the right towards the wheel spindle 28 on the pin 11.

Although the caliper 16 slides on the pin 12 and the inboard brake pad assembly 23 slides on the pin 11, braking forces from both the inboard and outboard friction pads 42 and 44 are proportionately transmitted through pins 11 and 12, the wheel spindle 28 or to some other suitable support member to which the pins 11 and 12 are attached. A portion of the frictional braking forces between the outboard brake pad 44 and the disc 14 are transferred directly through caliper 16 to pin 12. The remaining portion are transferred through inboard backing plate 35 by way of shoulders 20 and therethrough to pin 11.

Similarly a portion of the braking forces between inboard friction pad 42 and disc 14 is transferred directly to pin 11 with the remaining portion being transferred to pin 12 by way of the shoulders 20 and through caliper 16.

When the brake assembly described hereinabove is actuated, a counter-clockwise couple K (see FIG. 5) is imparted to caliper 16 resulting in a slight rotation of the caliper in the same direction. If the outboard friction pad 44 were positioned symmetrically about the axial centerline of piston 22, such rotation of the caliper would result in nonuniform loading of friction pad 44 with higher loading over the trailing portion of the pad than that over the leading portion. Such nonuniform loading would thus cause uneven wear of pad 44. To compensate for this phenomena outboard friction pad 44 is non-symmetrically positioned with respect to the axial centerline of piston 22.

The relationship between the pressure foot print of piston 22 upon the inboard brake pad assembly 23 and the geometry of the outboard brake pad assembly 17 is further illustrated in FIG. 17. Circle 52, in FIG. 17, represents the piston 22 foot print upon inboard brake pad assembly 23 and is superimposed upon outboard brake pad assembly 17. The center of pressure of piston 22 upon inboard brake pad assembly 23 lies upon the axial centerline of piston 22 and is represented by point P. The centroid of outboard brake pad 44 is also shown in FIG. 17 and identified as point C. It is to be noted that the center of pressure, or axial force line, of piston 22 leads centroid C, of brake pad 44, by the distance d. Distance d represents the approximate displacement of the caliper resultant force upon friction pad 44 because of the caliper's counter-clockwise rotation. Therefore the centroid C of friction pad 44 is physically displaced, the distance d from the piston centerline so that the caliper resultant force may act therethrough thereby causing uniform loading of friction pad 44. Distance d may be determined by known analytical means or by known testing procedures.

By the counter-clockwise rotation of caliper 16, the caliper, inboard backing plate 35 and pins 11 and 12 combine to establish a counteracting clockwise couple such that upon release of the brake assembly caliper 16 rotates clockwise thereby causing a separation between disc 14 and the inboard and outboard friction pads resulting in reduced disc brake drag upon rotor 14 during free wheeling.

It will be appreciated that various changes and modifications may be made in the above described exemplary embodiment of the invention without departing from the spirit and the scope of the following claims.

I claim:

1. An improved disc brake for engaging a rotatable disc having an axis of rotation and inboard and outboard frictional surfaces, said disc brake comprising two pins, means for affixing said pins to a stationary structure member inboard of said disc to extended parallel to and radially spaced from said axis with said pins spaced apart, a caliper extending over the periphery of said disc and having inboard and outboard legs, means mounting said inboard caliper leg to slide axially on one of said pins, an outboard brake pad, means mounting said outboard brake pad on said outboard caliper leg, said outboard brake pad moving into and out of frictional engagement with said outboard frictional surface as said caliper moves axially on said one pin, an inboard brake pad, means mounting said inboard brake pad to slide axially on the other of said pins into and out of frictional engagement with said inboard frictional surface, said inboard caliper leg defining a cylinder opening towards said inboard pad, and piston means located in said cylinder for moving said inboard pad against said inboard frictional surface when a fluid is introduced into a chamber defined between said cylinder and said piston.

2. An improved disc brake, as set forth in claim 1, and further including guide means on said caliper extending parallel to said disc axis, and means on said inboard brake pad slidably engaging said guide means to slidably retain said inboard brake pad on said caliper.

3. An improved disc brake, as set forth in claim 2, wherein said means mounting said inboard caliper leg on said one pin allows limited pivotal movement of said caliper about said one pin, and wherein said means mounting said inboard brake pad on said other pin allows limited pivotal movement of said inboard brake pad about said other pin, whereby said inboard and outboard brake pads pivot relative to one another when said brake is released.

4. An improved disc brake, as set forth in claim 3, whereby said one pin is the leading one of said pins in a normal direction of rotation of said disc and said other pin is a trailing one of said pins in such normal direction or rotation of said disc.

5. In a disc brake assembly for engaging a rotatable disc having an inboard and outboard frictional surface, said assembly including a floating caliper slidably supported on a single pin, said caliper having an outboard leg and an inboard leg interconnected by a bridge portion axially extending across said rotatable disc, frictional braking means attached to said caliper outboard leg for frictionally engaging the outboard frictional surface of said rotatable disc, the improvement comprising a floating inboard brake pad assembly having a backing plate, a friction pad for frictionally engaging the inboard frictional surface of said rotatable disc attached to said backing plate, said backing plate slidably engaging said caliper bridge and slidably supported upon a single pin means affixed to a stationary structure member whereby a portion of the outboard friction pad braking torque is transferred through said caliper bridge to said inboard brake pad assembly backing plate and into the stationary structure through the inboard backing plate pin support means, and a portion of the inboard friction pad braking torque being transmitted from the inboard backing plate through the caliper to the stationary structure through said caliper pin support means.

6. In a disc brake assembly for engaging a rotatable disc having an inboard and outboard frictional surface, said assembly including caliper means slidably attached to a first stationary structure member by a first mounting means, said caliper means including an outboard leg and an inboard leg, said outboard leg having frictional braking means attached thereto for frictionally engaging the outboard frictional surface of said rotatable disc, the improvement comprising inboard brake pad means including a backing plate, a friction pad attached to said backing plate for frictionally engaging the inboard frictional surface of said rotatable disc, said backing plate slidably engaging said caliper means and slidably attached to a second stationary structural member by a second mounting means whereby a portion of the outboard friction pad braking torque is transferred through said caliper means to said inboard brake pad backing plate and into said second stationary structure, and a portion of the inboard friction pad braking torque being transmitted from the inboard backing plate through the caliper means to said first stationary structure.

* * * * *